(No Model.)
P. V. GUERRY.
BRAKE FOR DENTAL ENGINES.
No. 510,856. Patented Dec. 12, 1893.
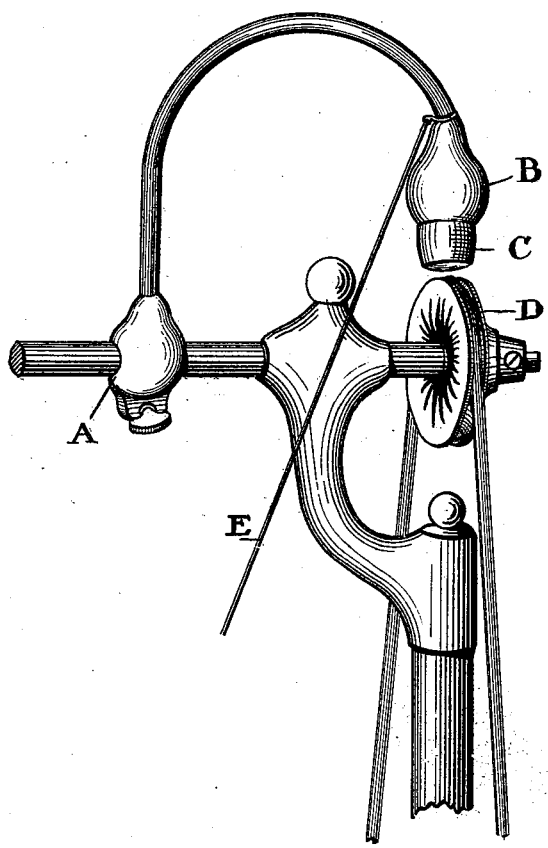

UNITED STATES PATENT OFFICE.

PETER V. GUERRY, OF PHILADELPHIA, PENNSYLVANIA.

BRAKE FOR DENTAL ENGINES.

SPECIFICATION forming part of Letters Patent No. 510,856, dated December 12, 1893.

Application filed June 30, 1893. Serial No. 479,309. (No model.)

*To all whom it may concern:*

Be it known that I, PETER V. GUERRY, a citizen of the United States, residing in Philadelphia city and county, State of Pennsylvania, have invented a new and useful Brake for Dental Engines, of which the following is a specification.

My invention relates to a device for enabling the patient operated upon to stop the dental engine at will.

The object of my invention is to give to the patient the power of stopping the engine at any moment that the operations of the dentist become too painful or irksome to him. By the sense of security thus created in the mind of the patient, from the knowledge of his power to stop the operation the moment it becomes too painful, his passiveness is greatly increased, and the dentist thereby greatly facilitated in his work. I attain this object by the mechanism illustrated in the accompanying drawing in which the figure is a side view of a portion of the dental engine showing the small pulley upon the end of the shaft holding and turning the drill or burr; with the brake fastened to sheathing on shaft.

The brake consists of a curved rod clamped at one end A to the sheathing of the shaft, having a socket at the other end B in which is inserted a piece of rubber or leather C or similar device for friction surface, which comes just above and close to the pulley D. There being sufficient spring in the rod, by pulling downward upon cord E, the piece C is brought in contact with the pulley D thereby stopping its revolutions. The movement of the portion of the brake which comes in contact with the pulley on the tool shaft, is in a line approximately corresponding with the radius of the said pulley.

The cord E is held by the patient upon whom the dentist is operating, and the patient by the slightest pull upon this cord can stop the operation of the dental engine at will.

I claim as my invention and desire to secure by Letters Patent—

1. The combination with a dental engine, comprising the usual standard, tool shaft and pulley, of a curved rod clamped at one end to the sheathing of said shaft, the free end thereof projecting just above and near the periphery of said pulley and provided with a socket, a suitable friction device seated in said socket to frictionally engage said pulley, and a cord attached to the free end of said rod and designed to extend within reach of the patient, substantially as described.

2. The combination with a dental engine comprising the usual standard, tool shaft and pulley, of a brake comprising a frictional surface adapted to contact with the periphery of the pulley and means whereby the brake may be moved perpendicularly to the axis of said pulley substantially as described.

PETER V. GUERRY.

Witnesses:
JNO. STOKES ADAMS,
JOHN J. BIGLEY.